(12) United States Patent
Piduri et al.

(10) Patent No.: US 10,628,055 B2
(45) Date of Patent: Apr. 21, 2020

(54) MANAGEMENT OF STORAGE REPLICATION CONSISTENCY GROUPS USING AUTOMATIC REPLICATION GROUP IDENTIFIERS

(71) Applicant: VMware, Inc., Palo Alto, CA (US)

(72) Inventors: Sudarsana R. Piduri, Santa Clara, CA (US); Derek Uluski, Weymouth, MA (US)

(73) Assignee: VMware, Inc., Palo Alto, CA (US)

( * ) Notice: Subject to any disclaimer, the term of this patent is extended or adjusted under 35 U.S.C. 154(b) by 158 days.

(21) Appl. No.: 15/188,963

(22) Filed: Jun. 21, 2016

(65) Prior Publication Data

US 2017/0364285 A1    Dec. 21, 2017

(51) Int. Cl.
*G06F 3/06* (2006.01)
*G06F 17/30* (2006.01)
*G06F 9/455* (2018.01)
*G06F 16/27* (2019.01)
*G06F 16/23* (2019.01)

(52) U.S. Cl.
CPC ............ *G06F 3/0619* (2013.01); *G06F 3/065* (2013.01); *G06F 3/067* (2013.01); *G06F 3/0617* (2013.01); *G06F 3/0644* (2013.01); *G06F 3/0664* (2013.01); *G06F 3/0689* (2013.01); *G06F 9/45558* (2013.01); *G06F 16/2365* (2019.01); *G06F 16/27* (2019.01); *G06F 2009/45579* (2013.01); *G06F 2009/45583* (2013.01)

(58) Field of Classification Search
CPC .... G06F 3/065; G06F 3/0664; G06F 9/45558; G06F 17/30575; G06F 17/30371; G06F 2009/45583; G06F 3/0619; G06F 3/0617; G06F 3/0644
See application file for complete search history.

(56) References Cited

PUBLICATIONS

Wei-Dong Zhu et al., "Disaster Recovery and Backup Solutions for IBM FileNet P8 Version 4.5.1 Systems," Jun. 2010, First Edition, International Business Machines Corporation.

*Primary Examiner* — Gurtej Bansal
(74) *Attorney, Agent, or Firm* — Loza & Loza, LLP

(57) ABSTRACT

System and method for managing storage replication consistency groups for storage objects of processing entities uses a replication group identifier for a storage replication consistency group received from a storage interface manager of a storage system with multiple computer data storage devices. The replication group identifier is received when a creation request for a new logical storage unit for a processing entity is transmitted from a host computer to the storage interface manager. The replication group identifier can then be used to request additional logical storage units that will be assigned to the same storage replication consistency group.

20 Claims, 6 Drawing Sheets

MANAGEMENT OF STORAGE REPLICATION CONSISTENCY GROUPS USING AUTOMATIC REPLICATION GROUP IDENTIFIERS

BACKGROUND

Software processes, such as virtual machines, are hosted in physical computers to run various applications. In order to ensure that these applications are available after one or more host computer failures, persistence storage objects for the software processes running on host computers may be replicated so that, if a host computer fails, the affected software processes may be restarted on a different host computer to resume running their applications. For virtual machines, the persistence storage objects may include items stored in a storage array, such as virtual disks and configuration files, which are necessary to run the virtual machines on host computers.

The storage objects of a single virtual machine should be grouped together for replication so that the virtual machine can be properly restarted during a failover process. In some situations, the storage objects of multiple virtual machines should be grouped together to ensure that all the virtual machines can be properly restarted during a failover process. The grouped storage objects should maintain write order fidelity during replication to ensure that virtual machine or machines can be properly failed over when needed. This group of storage objects is referred to herein as a storage replication consistency group. A storage replication consistency group is the smallest unit of failover, which means that all the storage objects in the storage replication consistency group fail over as a unit. Usually, one unique storage replication consistency group is assigned to each virtual machine. However, a storage replication consistency group may be assigned to multiple virtual machines, especially if these virtual machines are running dependent applications. Thus, the scale of storage replication consistency groups should ideally match the scale of virtual machines being replicated.

Unfortunately, not all storage arrays support this scale of storage replication consistency groups. Even if a storage array does support the scale of storage replication consistency groups, a user or an administrator must manually pick which storage replication consistency group to place each virtual machine, which is tedious.

BRIEF DESCRIPTION OF THE DRAWINGS

Throughout the description, similar reference numbers may be used to identify similar elements.

DETAILED DESCRIPTION

Figure 1:
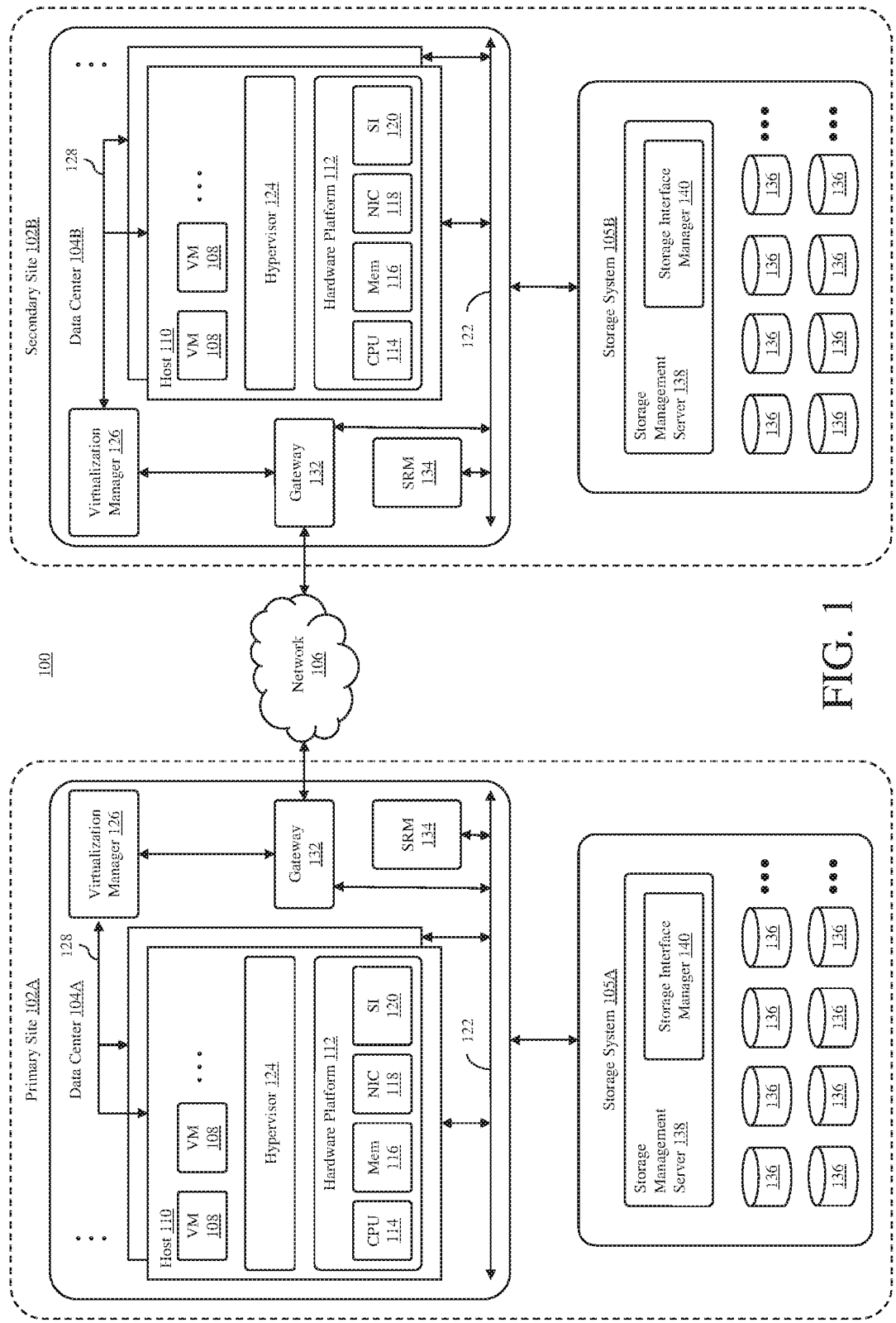
FIG. 1 is a block diagram of a distributed computer system in accordance with an embodiment of the invention.

FIG. 1 depicts a distributed computer system 100 with failover capabilities in accordance with an embodiment of the invention is shown. The distributed computer system includes computing and storage infrastructures to support a number of processing entities 108. As used herein, the term "processing entity" refers to any software entity that can run on a physical computer system, such as a software application, a software process, a virtual machine (VM), e.g., a VM supported by virtualization products of VMware, Inc., and a software "container", e.g., a Docker container. However, in this disclosure, the processing entities will be described as being VMs, although embodiments of the invention described herein are not limited to VMs. As described in more detail below, the distributed computer system provides an automated process to manage storage replication consistency groups for storage objects of any VMs running in the distributed computer system so that the VM can be properly failed over when needed, e.g., hardware and/or network failures.

As shown in FIG. 1, the distributed computer system 100 includes at least two sites, e.g., a primary site 102A and a secondary site 102B, that are connected to each other via a network 106. The primary site 102A includes at least one data center, e.g., a data center 104A, and at least one storage system, e.g., a storage system 105A. The data center 104A includes one or more host computer systems ("hosts") 110. The hosts may be constructed on a server grade hardware platform 112, such as an x86 architecture platform. As shown, the hardware platform of each host may include conventional components of a computing device, such as one or more processors (e.g., CPUs) 114, system memory 116, a network interface 118, storage interface (SI) 120, and other I/O devices such as, for example, a mouse and a keyboard (not shown). The processor 114 is configured to execute instructions, for example, executable instructions that perform one or more operations described herein and may be stored in the memory 116 and the storage system 105. The memory 116 is volatile memory used for retrieving programs and processing data. The memory 116 may include, for example, one or more random access memory (RAM) modules. The network interface 118 enables the host 110 to communicate with another device via a communication medium, such as a local network 122. The network interface 118 may be one or more network adapters, also referred to as a Network Interface Card (NIC). The storage interface 120 may be an adapter, such as a host bus adapter (HBA), that enables the host to communicate with the storage system 105A, which is used to store information, such as executable instructions, cryptographic keys, virtual disks, configurations and other data, which can be retrieved by the host.

Each host 110 may be configured to provide a virtualization layer that abstracts processor, memory, storage and networking resources of that host into the processing entities, e.g., the VMs 108, that run concurrently on the same host. The VMs run on top of a software interface layer, which is referred to herein as a hypervisor 124, that enables sharing of the hardware resources of the host by the VMs. One example of the hypervisor 124 that may be used in an embodiment described herein is a VMware ESXi™ hypervisor provided as part of the VMware vSphere® solution made commercially available from VMware, Inc. The hypervisor 124 may run on top of the operating system of the host or directly on hardware components of the host. For other types of processing entities, the host may include other virtualization software platforms to support those processing entities, such as Docker virtualization platform to support software containers.

The data center 104A also includes a virtualization manager 126 that communicates with the hosts 110 via a management network 128. In an embodiment, the virtualization manager 126 is a computer program that resides and executes in a computer system, such as one of the hosts, or in a processing entity, such as one of the VMs 108 running on the hosts. One example of the virtualization manager 126 is the VMware vCenter Server® product made available from VMware, Inc. The virtualization manager is configured to carry out administrative tasks for the hosts, including managing the hosts, managing the VMs running within each host, provisioning VMs, migrating VMs from one host to another host, and load balancing between the hosts.

The data center 104A may also include a gateway device 132, which may be implemented as a virtual appliance. The gateway device 132 is configured to provide the VMs 108 and other devices in the primary site with connectivity to external devices via the network 106. The gateway device 132 may manage external public Internet Protocol (IP) addresses for the VMs 108 and route traffic incoming to and outgoing from the primary site and provide networking services, such as firewalls, network address translation (NAT), dynamic host configuration protocol (DHCP), load balancing, and virtual private network (VPN) connectivity over the network 106.

In some embodiments, the data center 104A may include a site recovery manager (SRM) 134. The site recovery manager 134 controls various operations at the data center 104A to provide disaster protection. As an example, the site recovery manager allows management of recovery plans, enables non-disruptive recovery testing and executes site recovery and migration processes. The disaster recovery manager works with one or more other site recovery managers at other data centers, such as data centers at the secondary site 102B, to perform various operations related to disaster protection, such as disaster recovery failover and failback operations. One example of the site recovery managers is the VMware vCenter™ Site Recovery Manager™ product from VMware, Inc.

The storage system 105A at the primary site 102A provides data storage resources for the data center 104A, and may provide data storage resources to any other data centers at the primary site. Thus, the hosts 110 in the data center 104A, including the VMs 108 that may be running on those hosts, may access the storage resources of the storage system 105A like any other storage device connected to computer systems. The storage system 105A includes a number of computer data storage devices 136, which can be any type or combination of types of storage devices, such as solid-state devices (SSDs) and hard disks. These storage devices 136 may be located at a single facility or may be distributed at different facilities. The storage devices 136 may operate as components of a network-attached storage (NAS) and/or a storage area network (SAN). The storage devices 136 are used to support logical storage units, such as datastores and virtual volumes (VVOLs). VVOLs are part of a provisioning feature for VMware vSphere® product that changes how VMs are stored and managed. VVOLs enables an administrator to apply a policy to a VM which defines the various performance and service-level agreement requirements, such as Redundant Array of Independent Disks (RAID) level, replication or deduplication. The VM is then automatically placed on the storage array that fits those requirements. The use of VVOLs provides the ability to snapshot a single VM instead of just the traditional snapshot of an entire logical unit number (LUN) that may house several VMs, which saves space and reduces administrative overhead. As used herein, a logical storage unit is a unit of storage resources provided using one or more physical storage devices 136 of the storage system 105A. In this disclosure, the logical storage units supported by the storage devices 136 will be described as being virtual volumes, although embodiments of the invention described herein are not limited to virtual volumes.

The storage system 105A also includes a storage management server 138, which manages the operation of the storage system. In particular, the storage management server 138 creates and manages virtual volumes, which are mapped to physical storage locations in the storage devices 136. In an embodiment, the storage management server 138 is a computer program running on one or more physical computers at the primary site 102A or on one or more VMs 108 running at the primary site 102A. Although only one storage management server 138 is shown in FIG. 1, the storage system 105A may include multiple storage management servers that manage different groups of storages devices 136 in the storage system. These storage management servers may be physically distributed at different locations with the storage devices that are being managed by them.

In the illustrated embodiment, the storage management server 138 includes a storage interface manager 140, which can provide a storage awareness service for external components, such as the hosts 110 and virtualization managers 126 at the primary site 102A, so that these external components can obtain information about available storage topology, capabilities, and status of the storage system 105A. In addition, the storage interface manager 140 can initiate the creation of logical storage units, such as virtual volumes, in response to requests from the external components. Furthermore, the storage interface manager 140 manages storage replication consistency groups for the logical storage units. In particular, the storage interface manager 140 can create and delete storage replication consistency groups, and provide any relationships between virtual volumes and storage replication consistency groups. As an example, when a query is received from an external component regarding a particular virtual volume, the storage interface manager 140 will provide the identifier of any storage replication consistency group to which that virtual volume belongs. In addition, the storage interface manager 140 can also initiate the creation of logical storage units, such as virtual volumes, and assign those logical storage units to one or more storage replication consistency groups in response to requests from the external components with enough information to execute such operations. These operations of the storage interface manager allow the hosts 110 and the virtualization managers 126 to control storage replication consistency groups for virtual volumes to be used by VMs 108 without having to actually manage the storage replication consistency groups in the storage system 105A. In some embodiments, the storage interface manager 140 of the storage system 105A works with one or more storage interface managers of other storage system to execute the functions described above.

The secondary site 102B of the distributed computer system 100 may be similar to the primary site 102A, and thus, may include all the components of the primary site. In the illustrated embodiment, the secondary site 102B includes one data center 104B and one storage system 105B. However, in other embodiments, the secondary site 102B may include additional data centers and/or additional storage systems. Similar to the data center 104A at the primary site 102A, the data center 104B at the secondary site 102B includes one or more hosts 110, a virtualization manager 126, a gateway device 132 and the site recovery manager 134. Each host 110 in the secondary site 102B includes a hardware platform 112 with conventional components of a computing device, such as one or more processors (e.g., CPUs) 114, system memory 116, a network interface 118, storage interface 120, and other I/O devices such as, for example, a mouse and a keyboard (not shown). Each host also includes a hypervisor 124 that can support one or more VMs 108. The data center 104B further includes a local network 122 and a management network 128.

The storage system 105B at the secondary site 102B provides data storage resources for the data center 104B, and may provide data storage resources to any other data centers at the secondary site. Thus, the hosts 110 in the data center 104B, including the VMs 108 that may be running on those hosts, may access the storage resources of the storage system 105B like any other storage device connected to computer systems. Similar to the storage system 105A at the primary site 102A, the storage system 105B at the secondary site 102B includes a number of computer data storage devices 136 and a storage management server 138 with a storage interface manager. The storage interface manager 140 of the storage system 105B can provide a storage awareness service for external components, such as the hosts 110 and virtualization managers 126 at the secondary site 102B, so that these external components can obtain information about available storage topology, capabilities, and status of the storage system 105B. In addition, the storage interface manager 140 of the storage system 105B can initiate the creation of logical storage units, such as virtual volumes, in response to requests from the external components, and manage storage replication consistency groups for the logical storage units. In particular, the storage interface manager 140 of the storage system 105B can create and delete storage replication consistency groups, and provide any relationships between virtual volumes and storage replication consistency groups. The storage interface manager 140 of the storage system 105B can also perform other operations that were described above with respect to the storage interface manager 140 of the storage system 105A.

VMs that are running on host computers, such as the VMs 108 running on the hosts 110 in the distributed system 100, have VM objects that are stored in a storage system, such as the storage system 105A. These storage objects for VMs include virtual disks and other data objects to support the operation of the VMs, such as configuration files and snapshots. A snapshot is a copy of a VM's disk file at a given point in time. Snapshots provide a change log for the virtual disk and are used to restore a VM to a particular point in time when a failure or system error occurs. The VM storage objects are typically stored in one or more logical storage units, such as virtual volumes. In order to ensure proper failover for a failure-protected VM running on a source host computer, all the virtual volumes for that VM should be replicated as a single unit to ensure write order fidelity for the replica virtual volumes. The replication is usually performed by the storage systems, such as the storage systems 105A and 105B. The replica virtual volumes may be created using one or more storage devices that are at a different storage system than the storage system where the storage devices supporting the original virtual volumes reside. As an example, virtual volumes in one or more storage devices of the storage system 105A may replicated to one or more storage devices of the storage system 105B. The replica virtual volumes of a VM can then be used to recover the VM on a different host computer than the source host computer under the control of one or more site recovery managers, such as the site recovery managers 134 at the primary and secondary sites 102A and 102B. As an example, a VM running on a host computer in the data center 104A at the primary site 102A may be recovered on a host computer in the data center 104B at the secondary site 102B using replica virtual volumes in the storage system 105B. If multiple VMs need to be recovered together, all the virtual volumes for the multiple VMs should be replicated as a single unit to ensure write order fidelity for the replica virtual volumes. The storage replication consistency groups are used to replicate the virtual volumes of the VMs that must be recovered together. If a VM does not have to be recovered with another VM, then only the virtual volumes of that VM should be in a storage replication consistency group. However, if a VM does have to be recovered with another VM or VMs, then the virtual volumes of all the VMs should be in the same storage replication consistency group. The use of storage replication consistency groups in the distributed computer system 100 will be illustrated using the following examples, which are shown in FIGS. 2 and 3.

Figure 2:
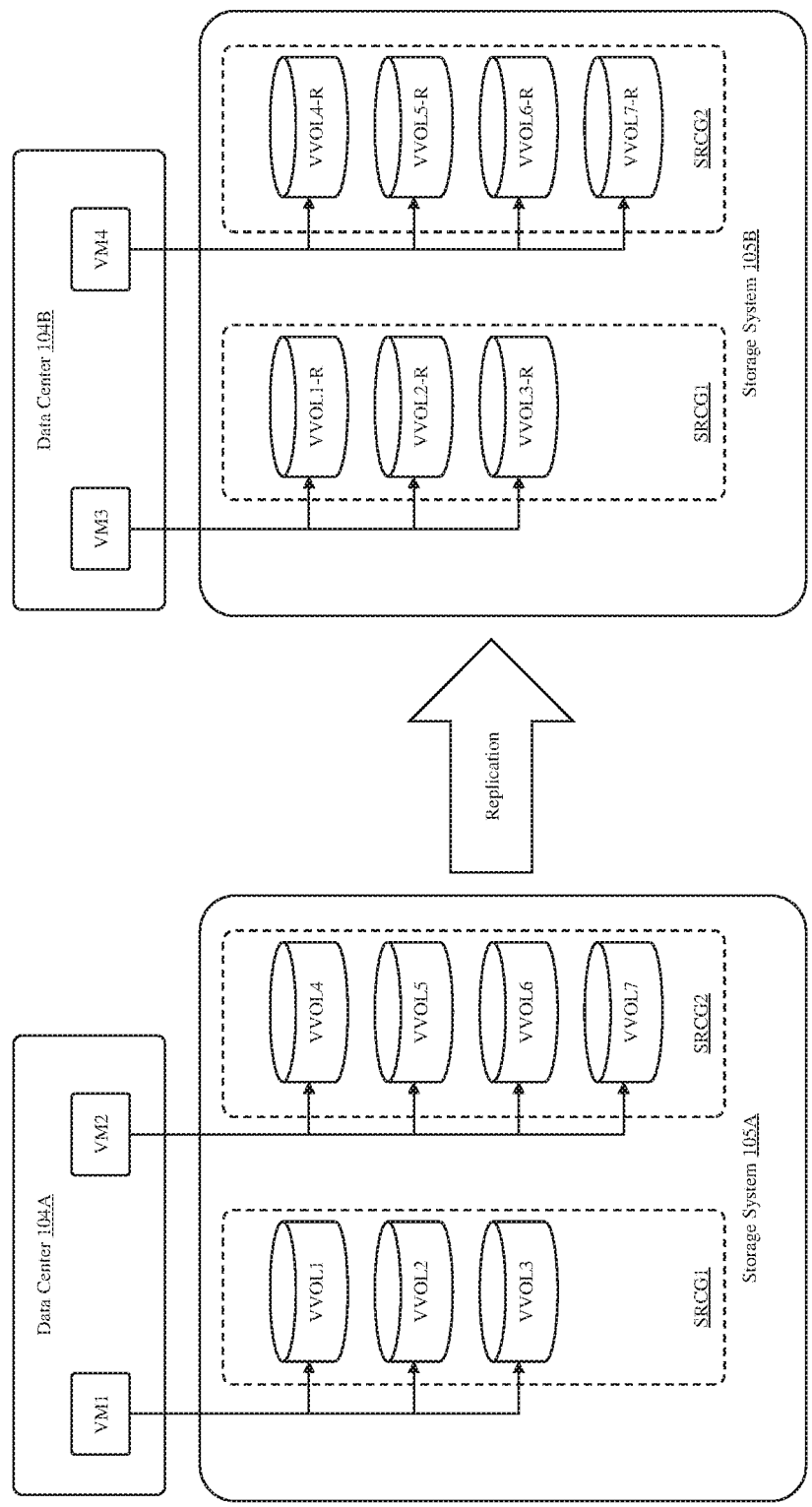
FIG. 2 illustrates virtual volumes of virtual machines running in the distributed computer system that are being replicated in different storage replication consistency groups in accordance with an embodiment of the invention.
Figure 3:
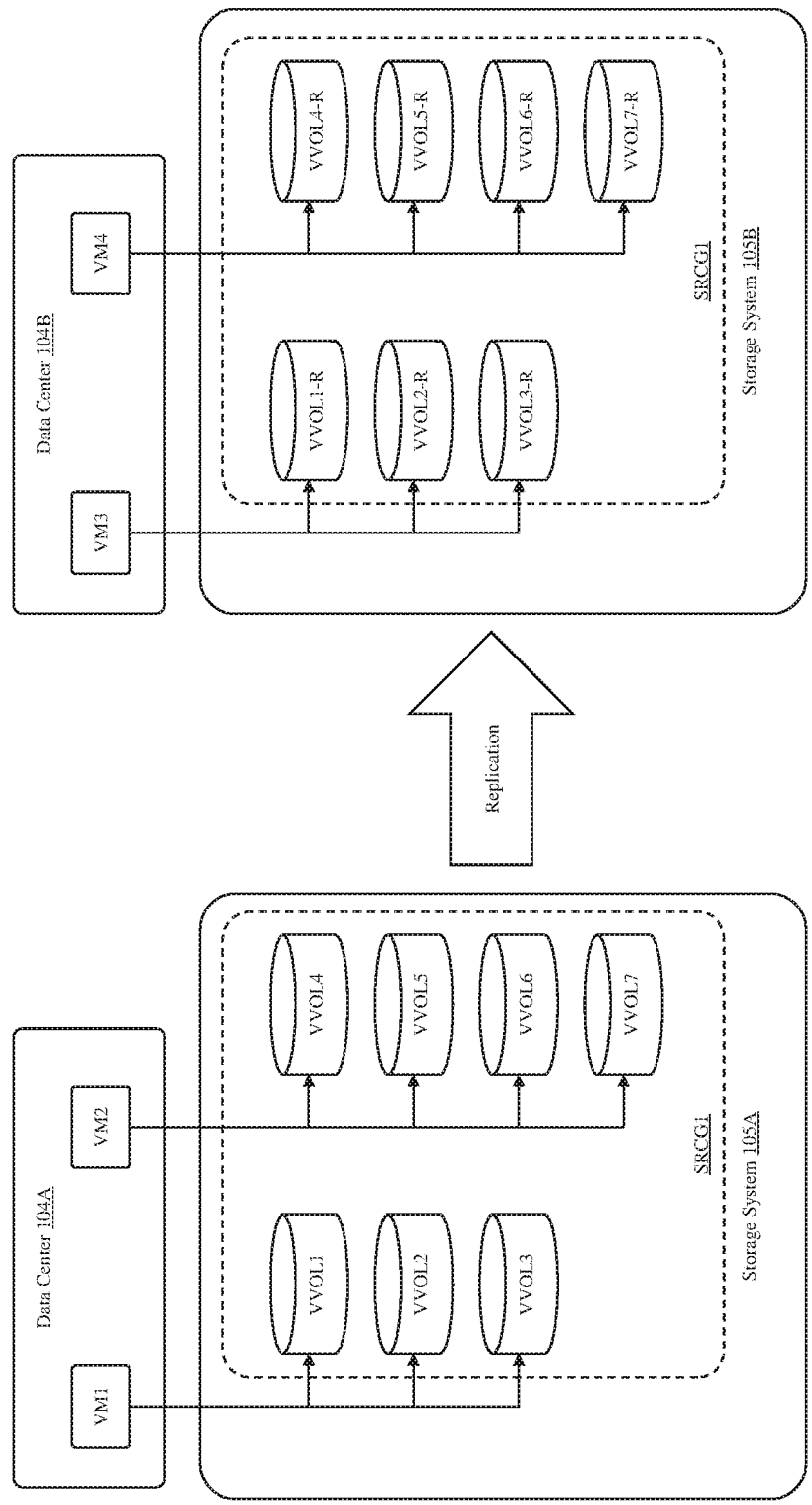
FIG. 3 illustrates virtual volumes of virtual machines running in the distributed computer system that are being replicated in a single storage replication consistency group in accordance with an embodiment of the invention.

The first example, which is shown in FIG. 2, involves two VMs, VM1 and VM2, operating in the data center 104A at the primary site 102A of the distributed computer system 100. These VMs may be running on the same host in the data center 104A or on two different host computers in the data center 104A. VM1 has three virtual volumes, VVOL1, VVOL2 and VVOL3. VVOL1 is used for configuration data of VM1, while VVOL2 and VVOL3 are used for virtual disks of VM1. VM2 has four virtual volumes, VVOL4, VVOL5, VVOL6 and VVOL7. VVOL4 is used for configuration data of VM2, VVOL5 and VVOL6 are used for virtual disks of VM2, and VVOL7 is used for a snapshot of VM2. The virtual volumes of VM1 and VM2 are stored in the storage system 105A. In this example, VM1 and VM2 do not have to be recovered together, and thus, the virtual volumes of VM1 and VM2 are not in the same storage replication consistency group. The virtual volumes of VM1 are assigned to one storage replication consistency group, SRCG1, while the virtual volumes of VM2 are assigned to another storage replication consistency group, SRCG2.

When the virtual volumes of VM1 and VM2 are replicated for failure protection, the virtual volumes that belong to the same storage replication consistency group are replicated together to ensure write order fidelity. Thus, VVOL1, VVOL2 and VVOL3, which belong to the same storage replication consistency group, i.e., SRCG1, are replicated together. As a result of the replication, replica virtual volumes VVOL1-R, VVOL2-R and VVOL3-R are created in the storage system 105B. Similarly, VVOL4, VVOL5, VVOL6 and VVOL7, which belong to the same storage replication consistency group, i.e., SRCG2, are replicated together. As a result of the replication, replica virtual volumes VVOL4-R, VVOL5-R, VVOL6-R and VVOL7-R, are created in the storage system 105B.

In the event of a failure, VM1 and VM2 can be restarted in the data center 104B at the secondary site 102B under the direction of the site recovery managers 134. VM1 and VM2 may be restarted on the same host in the data center 104B at the secondary site 102B or on two different hosts in the data center 104B at the secondary site 102B. In this example, VM1 in the data center 104A can be restarted in the data center 104B as VM3 using VVOL1-R, VVOL2-R and VVOL3-R in the storage system 105B, and VM2 in the data center 104A can be restarted as VM4 in the data center 104B using VVOL4-R, VVOL5-R, VVOL6-R and VVOL7-R in the storage system 105B. In some embodiments, VM3 and VM4 may be deployed in the data center 104B by the site recovery managers 134 when VM1 and VM2 have failed. In other embodiments, VM3 and VM4 may be deployed earlier in the data center 104B by the site recovery managers 134 but not activated until VM1 and VM2 have failed. The use of a storage replication consistency group for each of VM1 and VM2 ensures that VM1 and VM2 can be properly restarted during a failover process.

The second example, which is shown in FIG. 3, involves the same two VMs, VM1 and VM2, operating in the data center 104A at the primary site 102A of the distributed computer system 100. Again, these VMs may be running on the same host in the data center 104A at the primary site 102A or on two different hosts in the data center 104A at the primary site 102A. VM1 has three virtual volumes, VVOL1, VVOL2 and VVOL3, and VM2 has four virtual volumes, VVOL4, VVOL5, VVOL6 and VVOL7, which are all stored in the storage system 105A. In this example, VM1 may be running one or more applications, which are dependent on one or more applications running on VM2, and/or vice versa. Thus, VM1 and VM2 should be recovered together, and consequently, the virtual volumes of VM1 and VM2 are in the same storage replication consistency group. The virtual volumes of VM1 are assigned to a storage replication consistency group SRCG1, and the virtual volumes of VM2 are assigned to the same storage replication consistency group.

When the virtual volumes of VM1 and VM2 are replicated for failure protection, the virtual volumes that belong to the same storage replication consistency group are replicated together to ensure write order fidelity. Thus, VVOL1, VVOL2 and VVOL3, which belong to the storage replication consistency group SRCG1, and VVOL4, VVOL5, VVOL6 and VVOL7, which also belong to the same storage replication consistency group, are all replicated together. As a result of the replication, replica virtual volumes, VVOL1-R, VVOL2-R, VVOL3-R, VVOL4-R, VVOL5-R, VVOL6-R and VVOL7-R, are created in the storage system 105B.

In the event of a failure, VM1 and VM2 can be restarted in the data center 104B at the secondary site 102B under the direction of the site recovery managers 134. VM1 and VM2 may be restarted on the same host in the data center 104B at the secondary site 102B or on two different hosts in the data center 104B at the secondary site 102B. In this example, VM1 in the data center 104A can be restarted as VM3 in the data center 104B using VVOL1-R, VVOL2-R and VVOL3-R in the storage system 105B, and VM2 in the data center 104A can be restarted as VM4 in the data center 104B using VVOL4, VVOL5, VVOL6 and VVOL7 in the storage system 105B. In some embodiments, VM3 and VM4 may be deployed in the data center 104B at the secondary site 102B by the site recovery managers 134 when VM1 and VM2 have failed. In other embodiments, VM3 and VM4 may be deployed earlier in the data center 104B at the secondary site 102B by the site recovery managers 134 but not activated until VM1 and VM2 have failed. The use of the same storage replication consistency group for both VM1 and VM2 ensures that VM1 and VM2 can be properly restarted together during a failover process so that applications running on those VMs can properly resume their operations.

Figure 4:
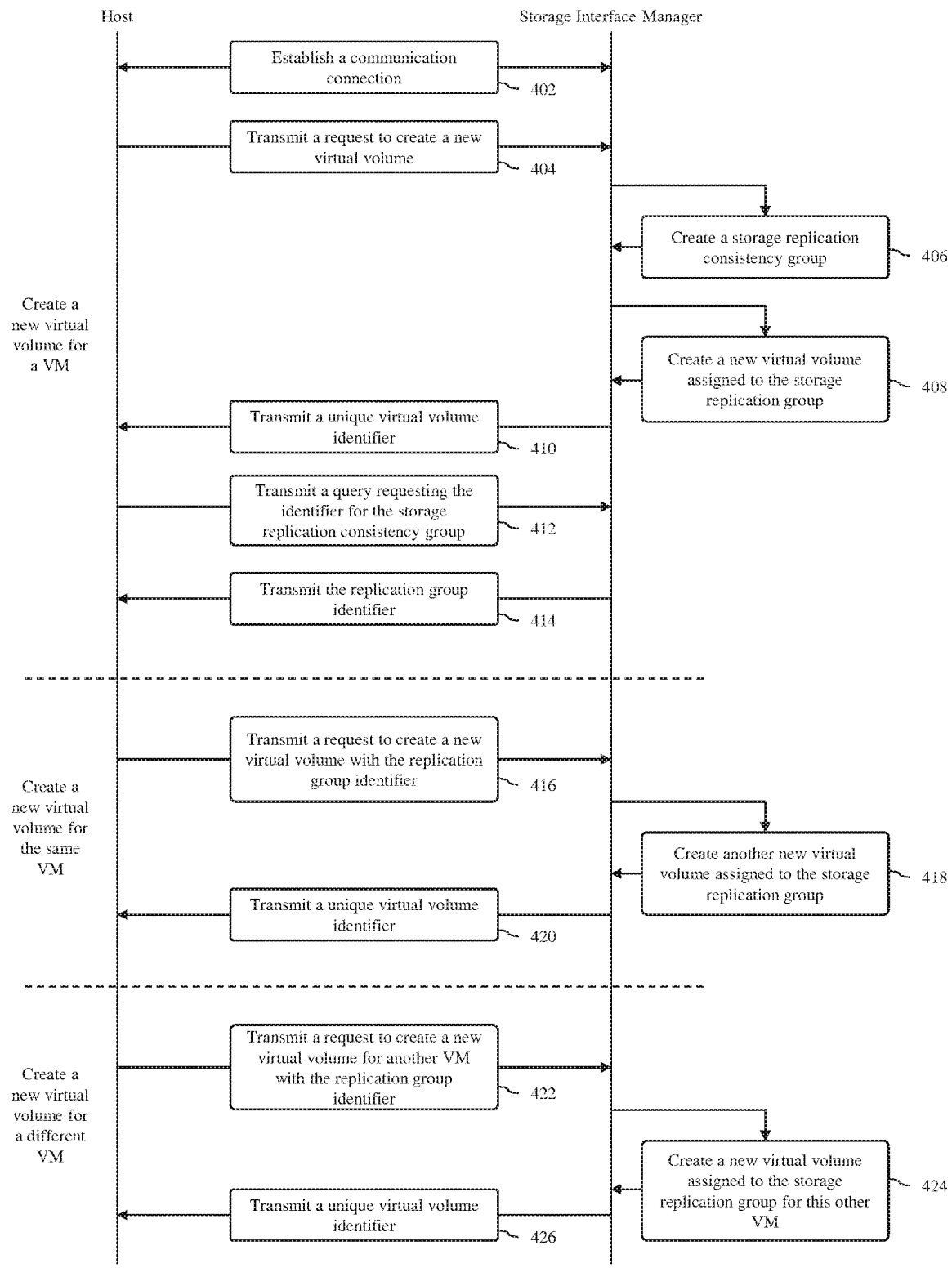
FIG. 4 is a swim lane diagram for creating virtual volumes in a storage replication consistency group in accordance with an embodiment of the invention.

The process of creating logical storage units, e.g., virtual volumes, and assigning the logical storage units to storage replication consistency groups in the distributed computer system 100 in accordance with an embodiment of the invention is described with reference to FIG. 4, which is a swim lane diagram between a host in the data center 104A and the storage interface manager 140 of the storage system 105A. At step 402, a communication connection is established between the host and the storage interface manager. The communication connection may be established using an application programming interface (API) of the storage interface manager 140. In an embodiment, communications between the host and the storage interface manager may be Hypertext Transfer Protocol (HTTP) based messages. Next, at step 404, a request to create a new virtual volume for a VM is transmitted from the host to the storage interface manager. The request includes at least an indication that the new virtual volume is to be assigned to a new replication group and may further include storage requirements of the new virtual volume. As an example, the indication that the new virtual volume is to be assigned to a new replication group may be represented by a unique number, such as "−1". The storage requirements may include particular storage capabilities required for the virtual volume, which may be represented by different storage tiers, e.g., gold, silver or bronze. As an example, the storage requirements may include type of drive, rpm (rotations per minute) of the drive and RAID (redundant array of independent disks) configuration.

In response, at step 406, a storage replication consistency group with a unique replication group identifier is created under the control of the storage interface manager. The unique replication group identifier may be a set of characters that includes any combination of alphanumeric characters and symbols, such as "g1". In addition, at step 408, a new virtual volume with a unique virtual volume identifier is created under the control of the storage interface manager and assigned to the storage replication consistency group. The unique virtual volume identifier may also be a set of characters that includes any combination of alphanumeric characters and symbols, such as "v1". Next, at step 410, the unique virtual volume identifier is transmitted to the host by the storage interface manager, which will be used by the host to take the necessary steps for the VM to use the new virtual volume that corresponds to the unique virtual volume identifier.

Next, at step 412, after receiving the identifier of the newly created virtual volume, a query is transmitted from the host to the storage interface manager requesting the identifier of the storage replication consistency group to which the virtual volume, e.g., "v1", belongs. In response, at block 414, the replication group identifier is transmitted to the host by the storage interface manager. In other embodiments, the replication group identifier may be transmitted to the host with the unique virtual volume identifier.

When another virtual volume needs to be created for the VM, the following steps are performed. At block 416, a request to create another virtual volume for the VM is transmitted from the host to the storage interface manager. The request includes the replication group identifier for the storage replication consistency group to which the new virtual volume will belong. The request may also include storage requirements for the new virtual volume. In response, at step 418, another new virtual volume with a unique virtual volume identifier is created under of the control the storage interface manager and assigned to the storage replication consistency group. Next, at step 420, the unique virtual volume identifier of this new virtual volume is transmitted to the host by the storage interface manager, which will be used by the host to take the necessary steps for the VM to use the new virtual volume that corresponds to the unique virtual volume identifier.

When a virtual volume needs to be created for another VM in the same storage replication consistency group, the following steps are performed. At block 422, a request to create a new virtual volume for another VM is transmitted from the host to the storage interface manager. The request includes the replication group identifier for the storage replication consistency group to which the new virtual volume will belong. The request may also include storage requirements for the new virtual volume. In response, at step 424, a new virtual volume with a unique virtual volume identifier is created under of the control the storage interface manager for this other VM. Next, at step 426, the unique virtual volume identifier of the new virtual volume is transmitted to the host by the storage interface manager, which will be used by the host to take the necessary steps for the VM to use the new virtual volume that corresponds to the unique virtual volume identifier.

These virtual volumes of one or more VMs that belong to the same storage replication consistency group will be replicated together in the storage system 105B to ensure write order fidelity. Consequently, during a failover, the VMs can be properly restarted together on one or more different hosts in the data center 104B at the secondary site 102B.

Figure 5:
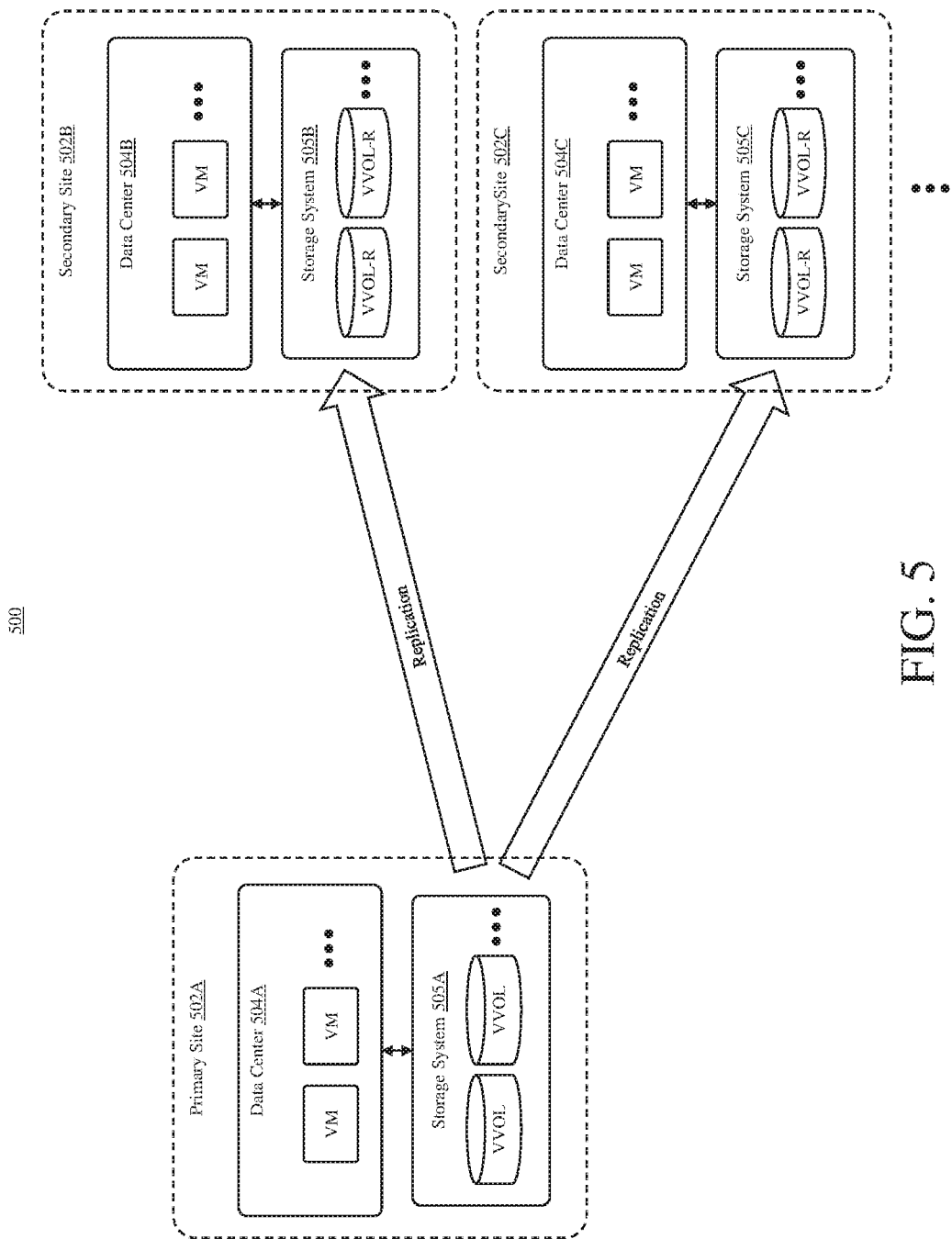
FIG. 5 is a block diagram of a distributed computer system in accordance with another embodiment of the invention.

In other embodiments, the management of storage replication consistency groups described above may be applied to a distributed computer system with multi-site replication topology. An example of such distributed computer system is illustrated in FIG. 5, which shows a distributed computer system 500 with a primary site 502A and multiple secondary sites 502B, 502C . . . in accordance with another embodiment of the invention. The primary site 502A of the distributed computer system 500 includes one or more data centers 504A that supports VMs and one or more storage systems 505A that support virtual volumes. Similarly, each of the secondary sites 502B, 502C . . . of the distributed computer system 500 includes one or more data centers 504A that supports VMs and one or more storage systems 505A that support virtual volumes. The data centers 504A, 504B, 504C . . . of the distributed computers system 500 may include similar components as the data center 104A and 104B of the distributed computers system 100 shown in FIG. 1. Similarly, the storage systems 505A, 505B, 505C . . . of the distributed computers system 500 may include similar components as the data center 104A and 104B of the distributed computers system 100 shown in FIG. 1. However, in the distributed computers system 500, virtual volumes of VMs in the primary site 502A are replicated at multiple secondary sites, e.g., both the secondary site 502B and 502C, using storage replication consistency groups, as described herein. Thus, during a failover, one or more VMs at the primary site 502A can be properly restarted at one of the designated secondary sites, e.g., the secondary site 502B or 502C, using the replica virtual volumes at that secondary site.

Figure 6:
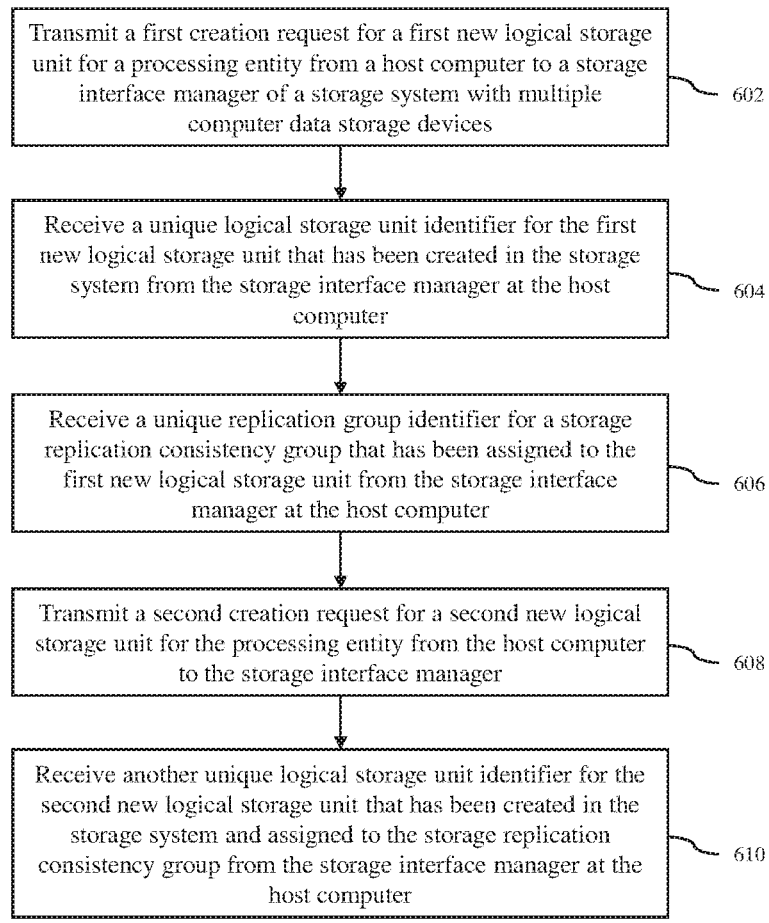
FIG. 6 is a flow diagram of a method for managing storage replication consistency groups for storage objects of processing entities in a distributed computer system in accordance with an embodiment of the invention.

A method for managing storage replication consistency groups for storage objects of processing entities in a distributed computer system in accordance with an embodiment of the invention is now described with reference to the process flow diagram of FIG. 6. At block 602, a first creation request for a first new logical storage unit for a processing entity is transmitted from a host computer to a storage interface manager of a storage system with multiple computer data storage devices. The first creation request includes an indication that a new storage replication consistency group is needed for the first new logical storage unit. At block 604, a unique logical storage unit identifier for the first new logical storage unit that has been created in the storage system from the storage interface manager is received at the host computer. At block 606, a unique replication group identifier for a storage replication consistency group that has been assigned to the first new logical storage unit from the storage interface manager is received at the host computer. At block 608, a second creation request for a second new logical storage unit for the processing entity is transmitted from the host computer to the storage interface manager. The second creation request includes the unique replication group identifier, which indicates that the second new logical storage unit is to be assigned to the storage replication consistency group. At block 610, another unique logical storage unit identifier for the second new logical storage unit that has been created in the storage system and assigned to the storage replication consistency group from the storage interface manager is received at the host computer. The storage replication consistency group is used to replicate the first and second new logical storage units of the storage replication consistency group together to ensure write order fidelity is maintained for any replica units of the first and second new logical storage unit.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner. Also, some of the steps can be repeated multiple times.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

The components of the embodiments as generally described in this document and illustrated in the appended figures could be arranged and designed in a wide variety of different configurations. Thus, the detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for managing storage replication consistency groups for storage objects of processing entities in a distributed computer system, the method comprising:

transmitting a first creation request for a first new logical storage unit for a processing entity from a host computer to a storage interface manager of a storage system with multiple computer data storage devices, the first creation request including an indication that a new storage replication consistency group is needed for the first new logical storage unit;

receiving a unique logical storage unit identifier for the first new logical storage unit that has been created in the storage system from the storage interface manager at the host computer;

receiving a unique replication group identifier for a storage replication consistency group that has been assigned to the first new logical storage unit from the storage interface manager at the host computer;

transmitting a second creation request for a second new logical storage unit for the processing entity from the host computer to the storage interface manager, the second creation request including the unique replication group identifier that indicates that the second new logical storage unit is to be assigned to the storage replication consistency group;

receiving another unique logical storage unit identifier for the second new logical storage unit that has been created in the storage system and assigned to the storage replication consistency group from the storage interface manager at the host computer; and replicating the first and second new logical storage units of the storage replication consistency group together at another storage system while ensuring write order fidelity is maintained for any replica units of the first and second new logical storage units at the another storage system.

2. The method of claim 1, wherein the first and second new logical storage units include virtual volumes.

3. The method of claim 1, wherein the processing entities include virtual machines.

4. The method of claim 1, further comprising establishing a communication connection between the host computer and the storage interface manager using an application programming interface (API) of the storage interface manager.

5. The method of claim 1, wherein the first creation request for the first new logical storage unit includes storage requirements for the first new logical storage unit.

6. The method of claim 1, wherein the first and second new logical storage units are used by the processing entity for at least one of a virtual disk, a snapshot and a configuration file.

7. The method of claim 1, further comprising transmitting another creation request for a new logical storage unit for another processing entity from the host computer to the storage interface manager, the another creation request including the unique replication group identifier, indicating that the new logical storage unit is to be assigned to the storage replication consistency group; and receiving a logical storage unit identifier for the new logical storage unit that has been created in the storage system and assigned to the storage replication consistency group from the storage interface manager at the host computer.

8. A non-transitory computer-readable storage medium containing program instructions for a method for managing storage replication consistency groups for storage objects of processing entities in a distributed computer system, wherein execution of the program instructions by one or more processors of a computer system causes the one or more processors to perform steps comprising:

transmitting a first creation request for a first new logical storage unit for a processing entity from a host computer to a storage interface manager of a storage system with multiple computer data storage devices, the first creation request including an indication that a new storage replication consistency group is needed for the first new logical storage unit;

receiving a unique logical storage unit identifier for the first new logical storage unit that has been created in the storage system from the storage interface manager at the host computer;

receiving a unique replication group identifier for a storage replication consistency group that has been assigned to the first new logical storage unit from the storage interface manager at the host computer;

transmitting a second creation request for a second new logical storage unit for the processing entity from the host computer to the storage interface manager, the second creation request including the unique replication group identifier that indicates that the second new logical storage unit is to be assigned to the storage replication consistency group;

receiving another unique logical storage unit identifier for the second new logical storage unit that has been created in the storage system and assigned to the storage replication consistency group from the storage interface manager at the host computer; and replicating the first and second new logical storage units of the storage replication consistency group together at another storage system while ensuring write order fidelity is maintained for any replica units of the first and second new logical storage units at the another storage system.

9. The computer-readable storage medium of claim 8, wherein the first and second new logical storage units include virtual volumes.

10. The computer-readable storage medium of claim 8, wherein the processing entities include virtual machines.

11. The computer-readable storage medium of claim 8, wherein the steps further comprise establishing a communication connection between the host computer and the storage interface manager using an application programming interface (API) of the storage interface manager.

12. The computer-readable storage medium of claim 8, wherein the first creation request for the first new logical storage unit includes storage requirements for the first new logical storage unit.

13. The computer-readable storage medium of claim 8, wherein the first and second new logical storage units are used by the processing entity for at least one of a virtual disk, a snapshot and a configuration file.

14. The computer-readable storage medium of claim 8, wherein the steps further comprise:

transmitting another creation request for a new logical storage unit for another processing entity from the host computer to the storage interface manager, the another creation request including the unique replication group identifier, indicating that the new logical storage unit is to be assigned to the storage replication consistency group; and receiving a logical storage unit identifier for the new logical storage unit that has been created in the storage system and assigned to the storage replication consistency group from the storage interface manager at the host computer.

15. A distributed computer system comprising:

a plurality of host computers operatively connected to a storage system that includes multiple computer data storage devices and a storage interface manager, the plurality of host computers including a host computer that includes a processor configured to:

transmit a first creation request for a first new logical storage unit for a processing entity to the storage interface manager of the storage system, the first creation request including an indication that a new storage replication consistency group is needed for the first new logical storage unit;

receive a unique logical storage unit identifier for the first new logical storage unit that has been created in the storage system from the storage interface manager;

receive a unique replication group identifier for a storage replication consistency group that has been assigned to the first new logical storage unit from the storage interface manager;

transmit a second creation request for a second new logical storage unit for the processing entity from the host computer to the storage interface manager, the second creation request including the unique replication group identifier that indicates that the second new logical storage unit is to be assigned to the storage replication consistency group;

receive another unique logical storage unit identifier for the second new logical storage unit that has been created in the storage system and assigned to the storage replication consistency group from the storage interface manager; and replicate the first and second new logical storage units of the storage replication consistency group together at another storage system while ensuring write order fidelity is maintained for any replica units of the first and second new logical storage units at the another storage system.

16. The distributed computer system of claim 15, wherein the first and second new logical storage units include virtual volumes and wherein the processing entities include virtual machines.

17. The distributed computer system of claim 15, wherein the processor is configured to establish a communication connection with the storage interface manager using an application programming interface (API) of the storage interface manager.

18. The distributed computer system of claim 15, wherein the first creation request for the first new logical storage unit includes storage requirements for the first new logical storage unit.

19. The distributed computer system of claim 15, wherein the first and second new logical storage units are used by the processing entity for at least one of a virtual disk, a snapshot and a configuration file.

20. The distributed computer system of claim 15, wherein the processor is configured to:

transmit another creation request for a new logical storage unit for another processing entity to the storage interface manager, the another creation request including the unique replication group identifier, indicating that the new logical storage unit is to be assigned to the storage replication consistency group; and receive a logical storage unit identifier for the new logical storage unit that has been created in the storage system and assigned to the storage replication consistency group from the storage interface manager.

* * * * *